US008443742B2

(12) United States Patent
Orrenius

(10) Patent No.: US 8,443,742 B2
(45) Date of Patent: May 21, 2013

(54) ARRANGEMENT FOR RECYCLING AIR IN AN AGRICULTURE MACHINE

(75) Inventor: Johan Orrenius, Ödeshög (SE)

(73) Assignee: Väderstad-Verken AB, Väderstad (SE)

( * ) Notice: Subject to any disclaimer, the term of this patent is extended or adjusted under 35 U.S.C. 154(b) by 0 days.

(21) Appl. No.: 13/502,384

(22) PCT Filed: Nov. 5, 2010

(86) PCT No.: PCT/SE2010/051208
§ 371 (c)(1),
(2), (4) Date: May 31, 2012

(87) PCT Pub. No.: WO2011/056138
PCT Pub. Date: May 12, 2011

(65) Prior Publication Data
US 2012/0234220 A1    Sep. 20, 2012

(30) Foreign Application Priority Data

Nov. 5, 2009    (SE) ........................................ 0950833

(51) Int. Cl.
*A01C 7/044* (2006.01)
*A01C 7/082* (2006.01)
*A01C 7/127* (2006.01)
*A01C 7/124* (2006.01)

(52) U.S. Cl.
USPC .......................................... 111/179; 111/174

(58) Field of Classification Search
USPC ......... 111/170–185; 239/67–69, 146; 422/28, 422/31–33, 111, 112, 295, 304; 426/316, 426/318–320, 419; 406/47, 48; 47/57.6, DIG. 9; 60/455, 459; 417/375
See application file for complete search history.

(56) References Cited

U.S. PATENT DOCUMENTS

| 4,780,279 A | 10/1988 | Enos |
| 2006/0278726 A1 | 12/2006 | Holly |
| 2010/0205953 A1* | 8/2010 | Bettin et al. .................... 60/455 |

FOREIGN PATENT DOCUMENTS

| FR | 2 730 712 | 8/1996 |
| JP | 2006-158306 | 6/2006 |

OTHER PUBLICATIONS

International Search Report issued on Feb. 25, 2011 in International Application No. PCT/SE2010/051208 filed Nov. 5, 2010.

*Primary Examiner* — Christopher J Novosad
(74) *Attorney, Agent, or Firm* — Drinker Biddle & Reath LLP

(57) ABSTRACT

An agricultural machine including a seed metering device to meter seeds for the distribution to the ground across which the agricultural machine moves. The seed metering device embraces a wall that is arranged to rotate. The seed metering device is furthermore arranged to communicate with a pressure actuating appliance for providing a wall pressure difference between a seed reception side, high-pressure side, of the wall and a side, low pressure side, of the wall that is opposite the seed reception side. The wall is provided with a plurality of through retention openings for the reception on the seed reception side of the wall, by the wall pressure difference, of seeds at the retention openings. Then, the seeds are transported, by the rotation of the wall, through a wall transportation distance whereupon they are released from the wall. The pressure actuating appliance includes a pneumatic device connected to an air line, which device provides a main air current through the air line toward the seed reception side of the wall. A return line is connected between the side of the wall that is opposite the seed reception side and the pneumatic device, in which return line a part of the main air current is arranged to be brought back to the air line and/or to an inlet side of the pneumatic device, while a part of the main air current is arranged to be directed down into the ground through a dump line.

10 Claims, 6 Drawing Sheets

ARRANGEMENT FOR RECYCLING AIR IN AN AGRICULTURE MACHINE

CROSS REFERENCE TO RELATED APPLICATIONS

This application is the National Stage of International Application No. PCT/SE2010/051208, filed Nov. 5, 2010, and claims the benefit of Swedish Application No. 0950833-4, filed Nov. 5, 2009, both of which are herein incorporated by reference in their entirety.

TECHNICAL FIELD

The present invention relates to the area of agricultural machines provided with seed metering devices, each one of which arranged to distribute one seed at a time to the respective drill furrow. Particularly, the invention relates to the seed metering devices that operate with an air current for a seed separation as well as for a metering of seeds to the respective drill furrow.

BACKGROUND OF THE INVENTION

Planters, i.e., agricultural machines for the sowing of drilled crops such as maize, sunflowers, sugar-beets and other crops, have usually a pneumatic metering system that is driven by negative or positive pressure. The seed grains are adhered to a rotating hole plate or to a rotating drum by means of positive or negative pressure.

In those cases the metering system comprises a hole plate, this is included in a device that often is called singulator by the fact that it separates grain by grain, each one of which via a line is brought further down toward the ground at a predetermined mutual distance. In case of a negative pressure system, air is sucked in through the hole plates, usually one for each drill row, and via lines, an air current is directed to the usually central fan of the machine. There, the air leaves the pneumatic device and is exhausted into the free air. In machines having positive pressure system, the air is sucked into the pneumatic device and is directed via lines to the rotating hole plates, where it usually escapes into the free air. In another positive pressure system, some of the air escapes at the hole plates and some of the air compels the seed grains via a line down into the soil.

More recently, an environmental issue has been brought to light, namely that the seed grains are treated with seed disinfectant, which aims at minimizing the risk of spreading of plant diseases. The seed disinfectant may be poisonous and thereby cause an environmental issue. A part of the seed disinfectant may when treated come loose from the seed grains in the agricultural machine as well as in earlier processes, transports, handling, etc. The disinfectant that comes loose goes with the seed in the form of a powder-like dust that easily drives in the air. The disinfectant released in the air via the fan system may be harmful to animals and insects in the immediate surroundings. Therefore, it is desirable to considerably reduce the amount of air polluted with disinfectant and exhausted in the free air.

There is a development in progress in order to adhere the disinfectant to the seed grains in a safer way. There is also a development in progress on the machine side, which almost entirely has been focused on bringing the excess air down into the ground. The machines have to be constructed so that the disinfectant set free is brought down into the soil most preferably in direct contact with the seed. Here, it is important that the air volume and the air speed are limited when the contaminated air is brought down into the soil, in order to prevent the polluted air from whirling up in the free air and the disinfectant from being spread.

THE OBJECT OF THE INVENTION

The object of the present invention is to provide an advantageous system for air conveyance of the air that passes the seed grains in an agricultural machine of the planter type.

The object is further to decrease the discharges in the air of the contaminated air that passes the seed grains.

In addition, the object is to keep down the degree of contamination in the air that passes the seed grains.

SUMMARY OF THE INVENTION

By the present invention, as this is set forth in the independent claim, the above-mentioned objects are met, wherein the mentioned disadvantages have been reduced. Suitable embodiments of the invention are defined in the dependent claims.

The invention applied in a negative pressure system in a planter of the plate-type involves that a significant part of the fan air that normally is exhausted into the free air is brought back to the hole plates, the singulators. A smaller part of this air has to be brought down into the ground to get a change of the air. If the air is not changed, its temperature will increase as it repeatedly passes a pneumatic device where energy is added. The air will also get an ever higher concentration of disinfectant. The part of the air that is not brought back is directed down into the ground, suitably in one or more drill furrows or, alternatively, fertilizer coulters.

In one embodiment of the invention, it is very suitable that all escaping air, i.e., the air that escapes foremost through the hole plates but also to a small extent from other parts of the singulator, is brought back to the inlet of the pneumatic device. This air quantity is a fraction of the air provided to the system by the pneumatic device. A significant part of the system air is conveyed continuously to compel the seed transport further through the singulator and down into the soil. When air is drawn off and directed down into the soil, the air is changed in the system and no further measures are needed to control the temperature and concentration of the same. In this way, discharge to the surrounding air can be decreased.

An agricultural machine in the form of a planter that has a pneumatic device in the form of a fan to singulate seeds, wherein the excess air entirely or partly is brought back to the air system to avoid that the polluted air is exhausted into the free air is one embodiment of the invention.

In a positive pressure system in such a planter, most of the air that escapes through the singulator and the hole plate is brought back to the inlet side of the pneumatic device, exhaust of contaminated air being avoided.

In a negative pressure system in such a planter, a significant part of the air flow is brought back to the air inlet side of the singulators and a fraction of the air that leaves the fan is directed down into the soil via sowing coulters for fertilizers or, alternatively, seeds.

The invention concerns an agricultural machine, which comprises a seed metering device to meter seeds for the distribution to the ground across which the agricultural machine moves. The seed metering device comprises a wall that is arranged to rotate. The seed metering device is furthermore arranged to communicate with a pressure actuating appliance for providing a wall pressure difference between a seed reception side, high-pressure side, of the wall and a side, low-pressure side, of the wall that is opposite the seed reception side. The wall is provided with a plurality of through retention openings for the reception of seeds on the seed reception side of the wall, by means of the wall pressure difference. The seeds adhere into the retention openings for subsequent transportation, by means of the rotation of the wall, through a wall transportation distance and are then released. The pressure actuating appliance comprises a pneumatic device connected to an air line. The pneumatic device provides a main air current through the air line toward the seed reception side of the wall. A return line is connected between the pneumatic device and the side of the wall that is opposite the seed reception side. In the return line, a part of the main air current is arranged to be brought back to the air line and/or to an inlet side of the pneumatic device, while a part of the main air current is arranged to be directed down into the ground through a dump line.

In one embodiment of the invention, the dump line is connected between the seed reception side of the wall and a ground means, e.g., a sowing coulter, for diverting at least a part of the main air current. In this connection, the dump line may be a separate line or a joint line for the metering of seeds down to a drill furrow in the ground. Accordingly, the embodiment allows several alternatives to diverting air flow out of the circular flow.

In a specified embodiment of the invention, the dump line is thus a seed metering line through which seeds are directed down to the ground.

In one embodiment of the invention, a branch return line is connected between the dump line and the pneumatic device. Hereby, return air may be directed back from the seed metering line directly to the pneumatic device.

In one embodiment of the invention, the branch return line is connected between the dump line and the return line. In such an embodiment, a joint return line is utilized between the seed metering line and the pneumatic device.

In a further development of these two latter embodiments of the invention, a seed screen is placed between the dump line and the branch return line. Said seed screen is placed so that no seeds can be directed into the return line.

In one embodiment of the invention, a first valve is placed in the branch return line arranged to regulate the air current between the dump line and the pneumatic device. Accordingly, said valve entails that the relation between the return air and the dumped air can be adjusted so that the air flow in the circular flow becomes correct.

In one embodiment of the invention, a fresh air line is connected to the return line, wherein the supply of fresh air can be regulated via a distributor valve placed between the return line and the fresh air line.

In one embodiment of the invention, in a positive pressure system, most of the main air current is directed from the air line back to the pneumatic device via the return line.

In one embodiment of the invention, in a negative pressure system, most of the main air current is directed from the pneumatic device to the dump line, while the rest of the air is directed back in the return line.

In the present application, the terms "positive pressure" and "negative pressure" have been related to an air pressure equal or close to the air pressure of the surrounding air. The terms "high-pressure side", "low-pressure side", "pressure difference", "pressure drop", "wall pressure difference", "low-pressure outlet" are related to the wall of the singulator, i.e., on which respective side of the wall that the pneumatic device creates a higher and a lower air pressure than on the opposite side.

BRIEF DESCRIPTION OF THE DRAWINGS

Now, the invention will be described in more detail, reference being made in connection with the accompanying drawing figures.

DESCRIPTION OF THE INVENTION

Figure 1:
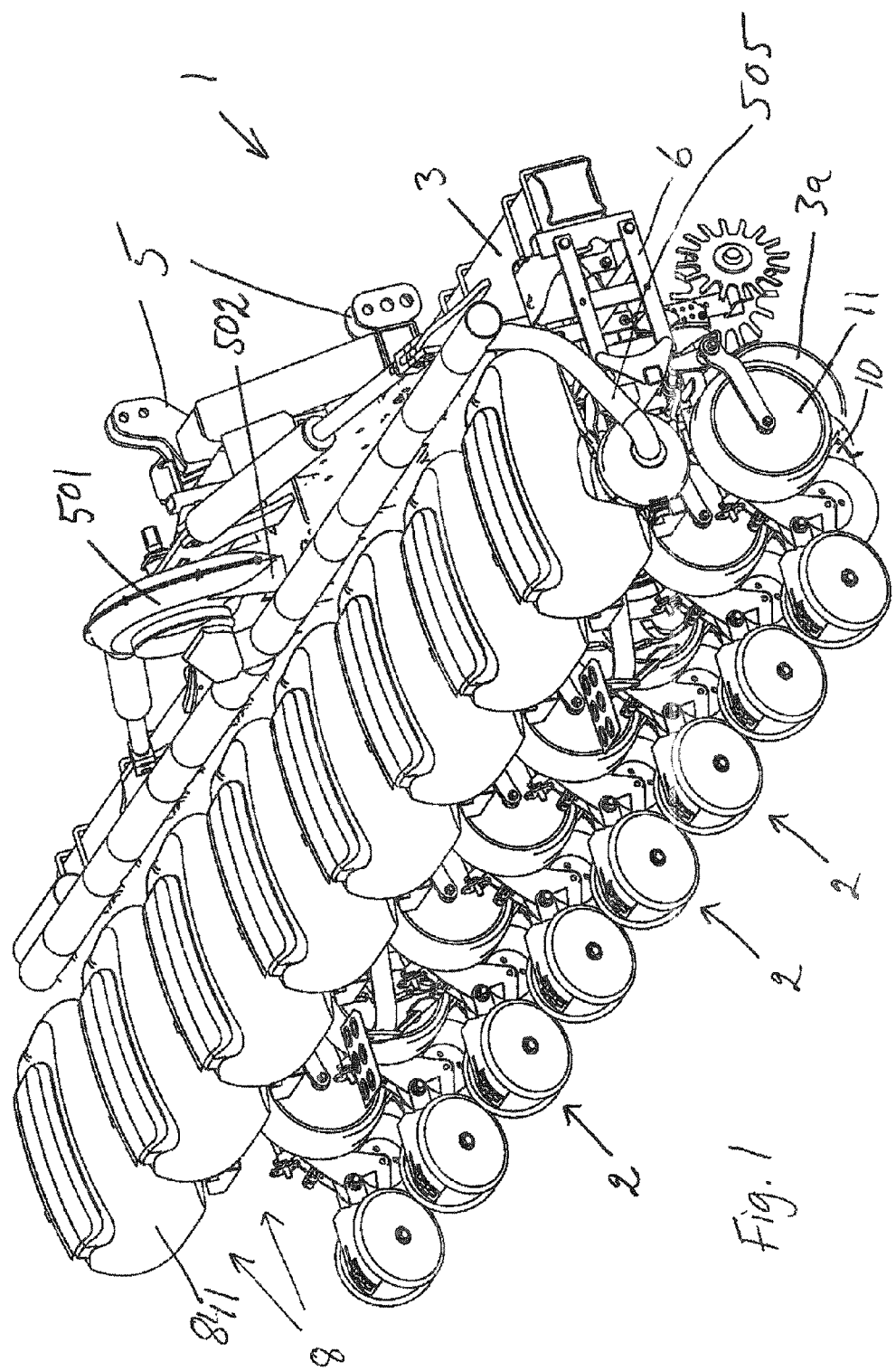
FIG. 1 schematically shows a perspective view from above of an agricultural machine of the plate-type having a positive pressure system according to one embodiment of the invention.

In the figures, the same reference numerals have been used for the corresponding parts in several embodiments.

FIG. 1 shows a view from above of an agricultural machine in the form of a planter 1 according to one embodiment of the invention. The planter embraces a number of drilling units 2 (here, eight ones are shown), each one of which, via a respective link device 6 (also FIG. 2), is attached to a structural member 3 (also FIG. 2) comprising a transverse steel joist. Naturally, the invention is applicable to agricultural machines having any number of drilling units 2. The structural member 3 forms a part of the frame of the machine that is carried by support wheels 3a. The planter is, by means of coupling means 5, arranged to be coupled behind a traction vehicle. During the motion of the machine 1 across the soil that is be sown, each one of the drilling units 2 is arranged to form, by means of two rotatable discs 10, (also FIG. 2) a drill furrow in the direction of travel of the machine. Each drilling unit 2 is arranged to be carried by at least one supporting wheel 11 (also FIG. 2).

Figure 2:
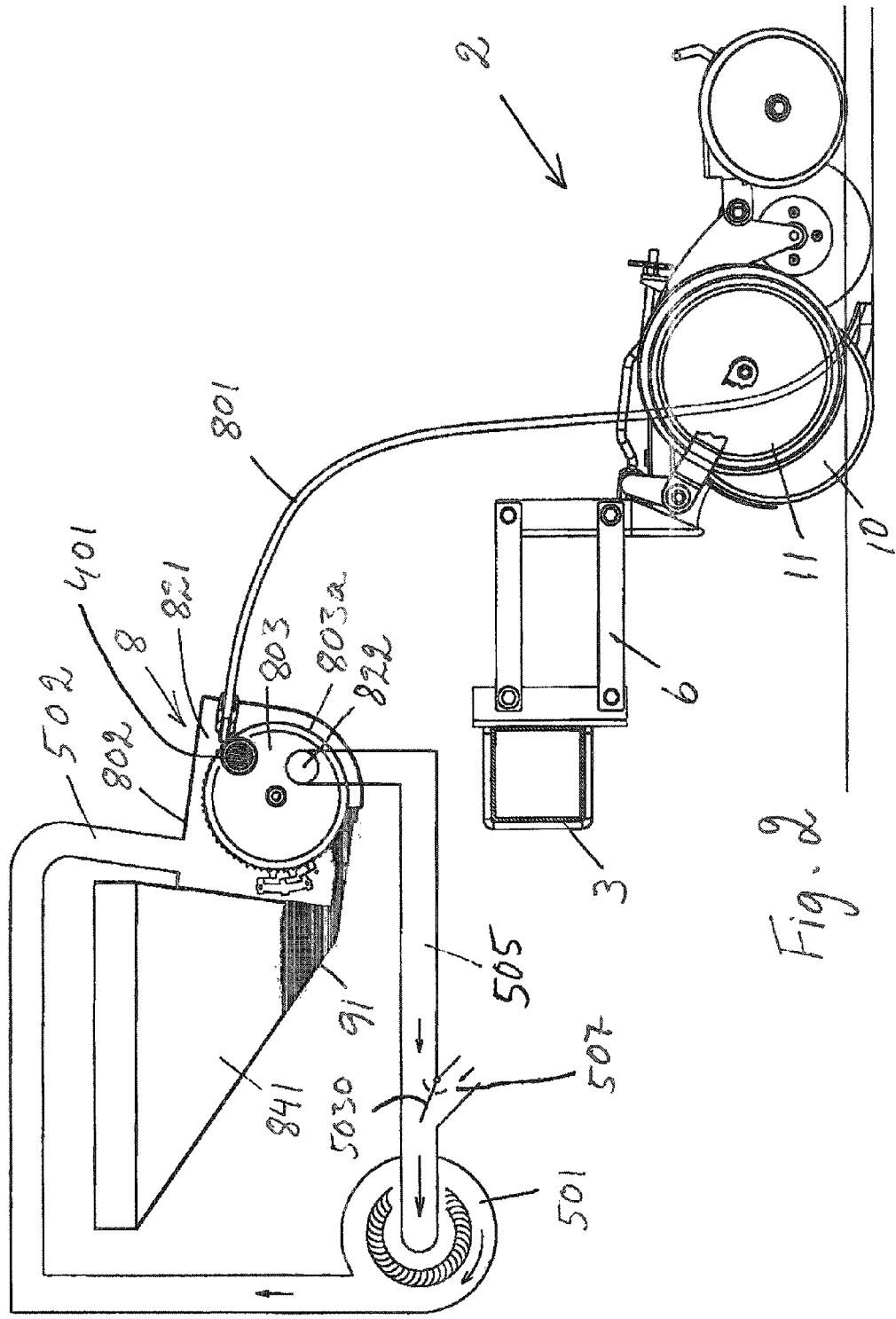
FIG. 2 schematically shows a side view of parts in an agricultural machine of the drum-type having a positive pressure system.

The planter 1 embraces eight seed metering devices 8, each one of which embraces a seed bin 841 (also FIG. 2). Each seed metering device 8 communicates in turn via eight seed metering lines 801 (FIG. 2) and with the eight drilling units 2, and is arranged to distribute, via the seed metering lines 801, one seed at a time to a respective drill furrow in the ground. For this sake, a lower mouth of the seed metering line 801 running from the seed metering device 8 is situated immediately behind the engagement of the discs 10 with the ground. Alternatively, the agricultural machine may have more or fewer than eight seed bins 841. In addition, each seed metering device 8 may serve more or fewer than eight drilling units 2, e.g., only one drilling unit 2 as has been shown. FIG. 1 also shows a pneumatic device 501 in the form of a fan, which provides an air current in air lines 502 through each seed metering device 8, at least a part of these air currents being directed in return lines 505 back to the fan.

According to FIG. 2, the seed metering device 8 comprises a housing 802 from which the seed metering lines 801 extend.

A seed metering element 803 in the form of a drum 803 is arranged in the housing 802 and comprises a circular-cylindrical casing 803a arranged to form a wall 803a between a first and a second area 821, 822 in the housing 802, situated outside and inside, respectively, the casing 803a. As can be seen in the figure, the seed bin 841 with its seeds 91 is situated on the outside of the casing 803a, which is the seed reception side of the casing 803a, wherein the seeds can be fed by gravity from the seed bin 841 toward the casing 803a.

As can be seen in FIG. 2, the agricultural machine comprises pressure actuating appliances comprising the pneumatic device 501, e.g., in the form of a fan, and air lines 502 communicating with the same, each one of which lines extends to each a seed metering device 8. More precisely, the first area 821 in the housing 802 communicates with the pneumatic device 501, which is arranged to provide a positive pressure in the air line 502 and in the first area 821, which gives rise to a pressure difference between the first area 821 and the second area 822. In the embodiment illustrated, this difference consists of a pressure drop from the first area to the second area. The second area 822 is connected to the inlet side of the pneumatic device 501 via additional pressure actuating appliances through the return line 505. Simultaneously, a fresh air line 507 is connected to the return line 505 in order to supply air to the circular flow. The supply of fresh air can be regulated via a distributor valve 5030 placed between the return line 505 and the fresh air line 507.

By the fact that these pressure actuating appliances provide said pressure difference between the first and the second area, separate seeds can be transported to and delivered in the seed metering lines 801, a part of the air being brought back to the pneumatic device via the return line 505 while the remaining air is directed via the seed metering lines 801 together with the seeds down into the drill furrow. Compensating air is then taken in via the fresh air line 507. Hereby, a minimum of air that has passed the seeds is discharged into the surrounding air, but most of it is directed down into the ground. This mentioned seed transportation is described in more detail in connection with FIG. 3.

Figure 3:
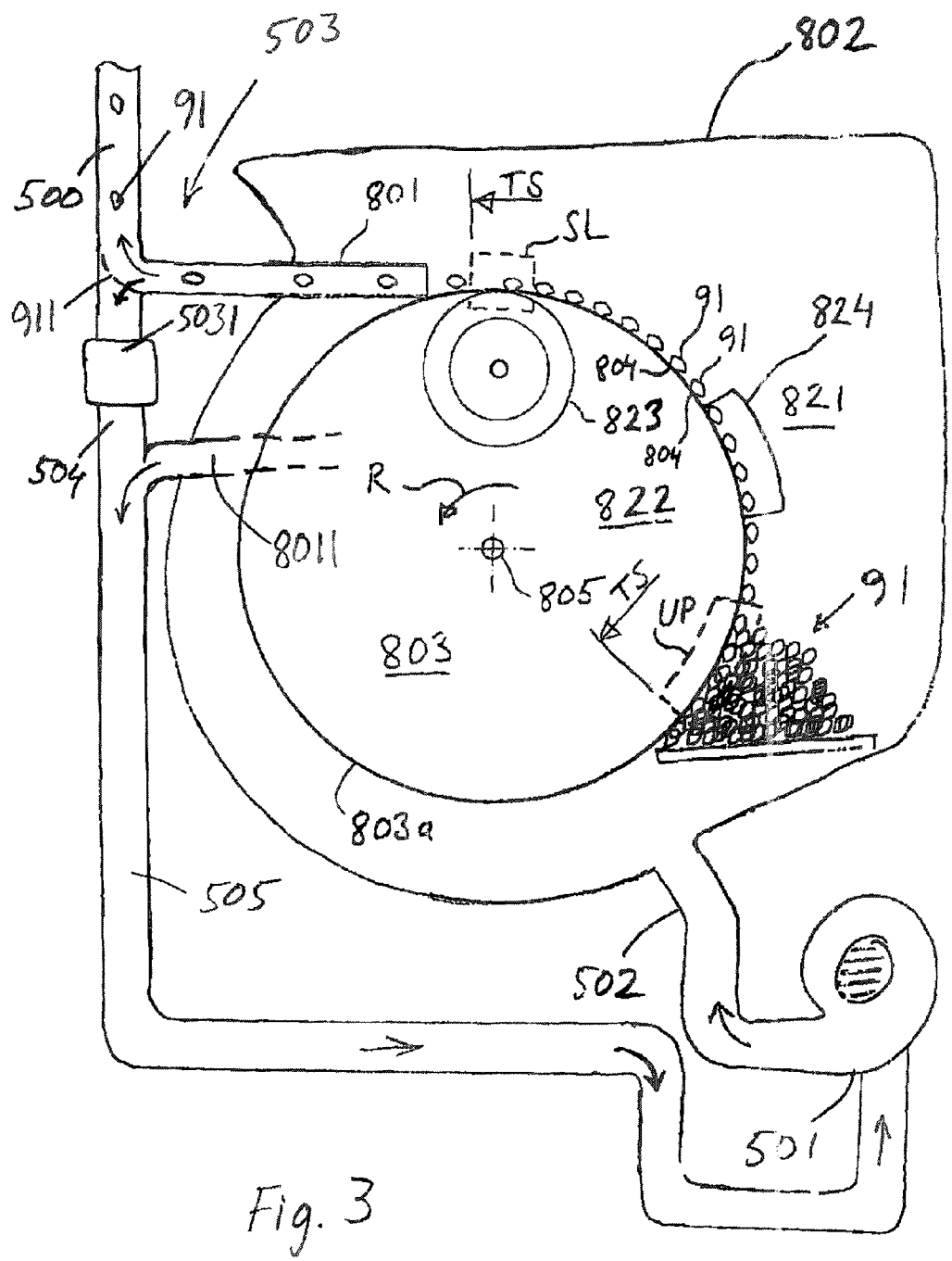
FIG. 3 shows a schematic side view of parts of an agricultural machine of the drum-type having a positive pressure system comprising a seed metering element and an alternative pneumatic system according to the invention.

As is indicated in FIG. 3 by the arrow R, the seed metering element 803 is arranged to rotate around a mainly horizontally orientated seed metering shaft 805 concentric with the casing 803a. This rotation is executed by means of a driving unit 401 (FIG. 2) that is connected with the seed metering element 803 and increases, in a known way, not described in more detail here, the speed of rotation of the seed metering element upon an increase of the speed of the agricultural machine, and vice versa.

As is seen in FIG. 3, on the outside of the casing 803a and at a distance from the seed metering shaft 805, the seed metering element 803 is arranged to take up, transport and release seeds 91 from the housing 802. The casing 803a has a plurality of through retention openings 804 distributed in the circumferential direction of the casing 803a into an array. In each array, the distance between two retention openings is the same along the entire array. Thanks to the pressure drop described above across the casing 803a, in a seed reception area UP (indicated by broken lines), a seed gets caught at each retention opening and is transported toward the respective seed metering line 801.

As can be seen in FIG. 3, the seed metering device is arranged to release the seeds in a release area SL (indicated by broken lines) at an inlet mouth of the respective seed metering line 801. The release of the seeds is enabled by a separation device 823 comprising a roll, rotatable with its rotation axis parallel to the rotation axis 805 of the casing 803a, and abutting against the inside of the casing in a position near the inlet mouth of the respective seed metering line 801. Upon passage, the roll 823 temporary plugs the retention opening, which makes that the pressure difference decreases and the seed comes loose from the casing 803a and is directed by the positive pressure in the first area 821 into the respective seed metering line 801. As an alternative to a roll, the separation device 823 may comprise separating walls on the inside of the casing that form a space at which the pressure difference is lower than elsewhere in the direction of rotation of the casing.

Accordingly, the seeds 91 are transported, by means of the rotation of the casing 803a, through a wall transportation distance TS (the extension of which is indicated by two arrows TS), comprising the seed reception area UP and the release area SL.

In FIG. 3, there is also schematically shown a double eliminator 824 situated between the seed reception area UP and the release area SL. The double eliminator 824 is in a known way arranged to remove possible additional seeds at a retention opening.

FIG. 3 schematically shows the pressure actuating appliances in the form of the pneumatic device 501, the communicating air line 502, air regulation devices 503, a branch return line 504 from the seed metering line 801, and a return line 505 from a low-pressure outlet 8011 as well as a dump line 500 for emission of air to the ground. The air regulation devices 503 comprise a pressure regulation valve 5031 placed in the branch return line 504 from the first area 821. Said pressure regulation valve has the possibility of being continuously regulated from the entirely closed position to the entirely open position. Hereby, air from the high-pressure side in the first area 821 may be directed back to the pneumatic device. The branch return line 504 is connected to the seed metering line 801 via a seed screen 911 that has the purpose of allowing air to pass through the screen to the return line but preventing seeds from passing the same. An adaptation of the pressure in the seed metering line 801 may hereby be regulated by the pressure regulation valve 5031. This means that the pressure difference across the casing 803a can be greater than the pressure difference between the first space 821 and the mouth of the respective seed metering line 801 behind the discs 10 (FIG. 2), since a part of the air can be directed back. As is seen in the figure, the dump line 500 consists of the seed metering line 801 but could in other embodiments be a separate line down into the ground.

FIG. 3 shows further that, if the pressure regulation valve 5031 is closed, air is directed only from the second area 822 through a return line 505 back to the first area 821 in the housing 802. Also said pressure regulation valve is a part of the previously mentioned pressure actuating appliances. In the figure, the air currents are marked by arrows. The return line 505 is connected to the inlet side of the pneumatic device 501, but also fresh air is taken in simultaneously with the return air on the inlet side of the pneumatic device, for instance such as has been shown in FIG. 2.

The arrangement with the pressure actuating appliances shown in FIG. 3 indicates several feasible embodiments, namely that return air is taken only from the second area 822, that return air also is taken from the first area 821, as well as that a sharing of return air may be made between the two areas. The FIGS. 2 and 3 show devices according to the invention applied to a planter of the drum-type.

Figure 4:
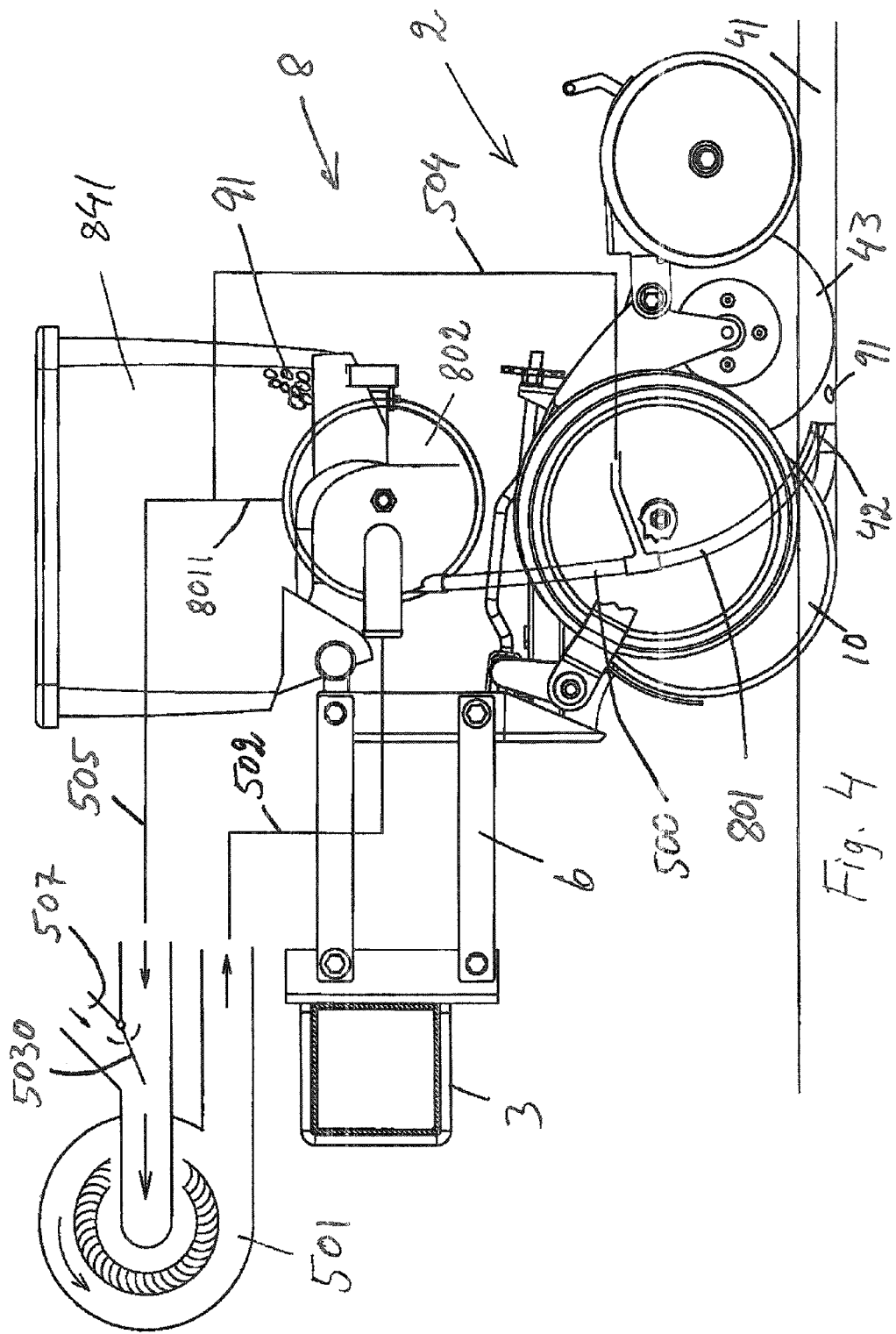
FIG. 4 schematically shows a side view of parts in an agricultural machine of the plate-type having a positive pressure system according to an alternative embodiment of the invention.

FIG. 4 shows an alternative design of a drilling unit 2 for a planter. As previously shown, the planter comprises the drilling units 2, each one of which is, via a link device 6, attached to the planter on a structural member 3 comprising a transverse steel joist. The drilling unit 2 comprises a seed metering device 8 of the plate-type having a housing 802 from which seed metering lines 801 extend. Inside the housing, there is arranged a singulating device of the plate-type for the seeds, which is described in more detail in FIG. 5. As has been described in connection with FIG. 2, the planter comprises a seed bin 841 from which seeds 91 are fed by gravity down into the seed metering device 8. This communicates in turn with the seed metering lines 801 and is arranged to distribute, via the seed metering lines 801, one seed at a time to a respective drill furrow 41 in the ground. For this sake, a lower mouth 42 of the seed metering line 801 running from the seed metering device 8 is situated immediately behind the engagement of the discs 10 with the ground. Usually, a stop wheel 43 is arranged behind the lower mouth 42 to retard the speed of the seeds 91 in the drill furrow 41 and place them equidistantly from each other. Also this embodiment of the invention comprises pressure actuating appliances in the form of a pneumatic device 501, a communicating air line 502 and a return line 505. In addition, the pressure actuating appliances comprise a fresh air line 507 connected to the return line 505 in order to supply air to the circular flow. The supply of fresh air can be regulated via a distributor valve 5030 placed between the return line 505 and the fresh air line 507, as previously described in connection with FIG. 2. Further, this embodiment is provided with a branch return line 504 connected between the seed metering line 801 and the return line 505 via a low-pressure outlet 8011. Also in this embodiment, the seed metering line 801 is also a dump line 500 for emission of air to the ground. In addition, the branch return line 504 may comprise a pressure regulation valve in the corresponding way as has been shown in FIG. 3 to regulate return air from the dump line/seed metering line. The dump line and the seed metering line may also be separate lines. Analogously to FIG. 3, a seed screen may be placed adjacent to the branch return line 504.

Figure 5:
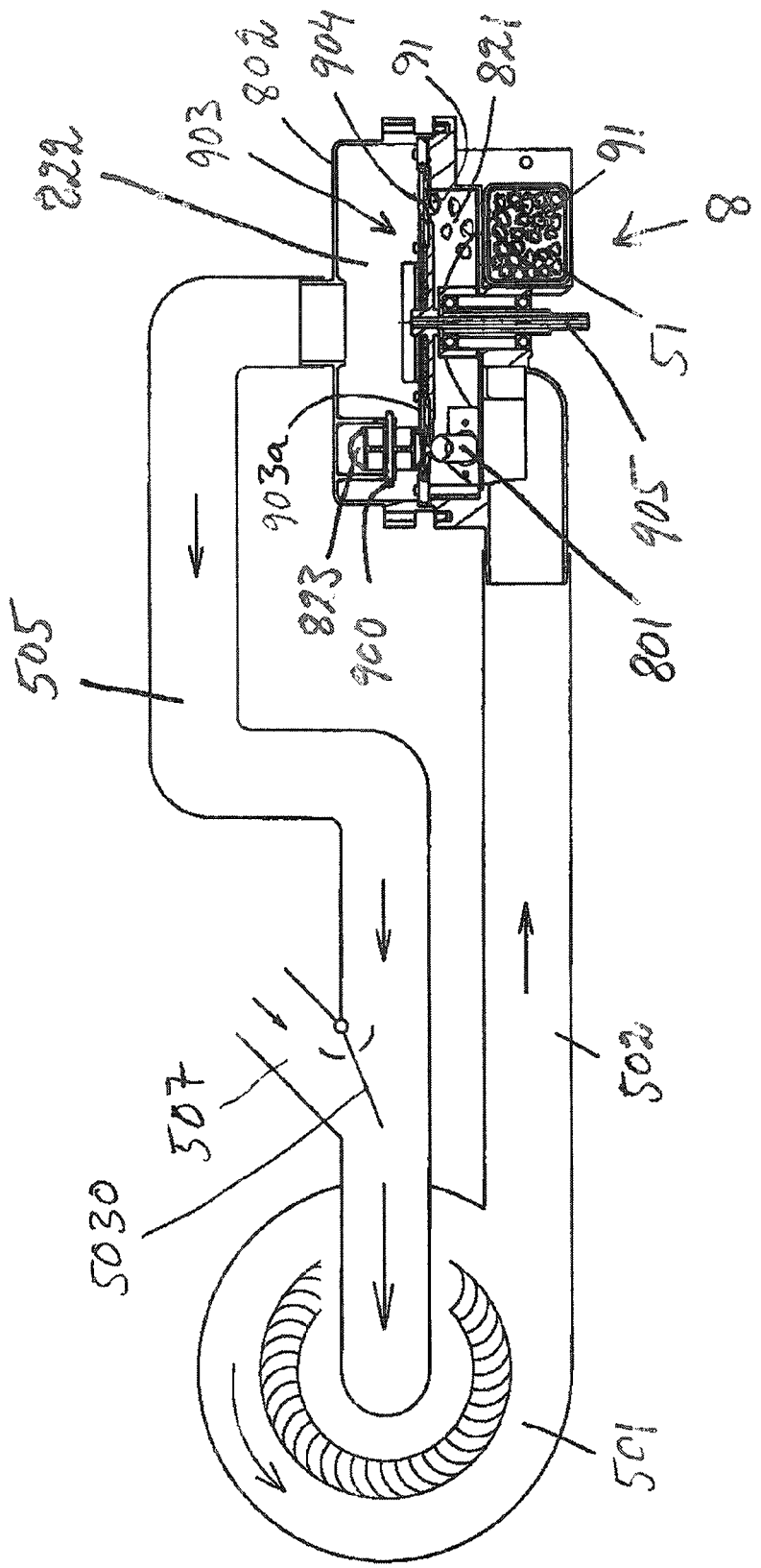
FIG. 5 shows a schematic detailed view from above according to FIG. 4.

FIG. 5 shows pressure actuating appliances comprising the pneumatic device 501 and air lines 502 communicating with the same, each one of which lines extends to each a seed metering device 8. A seed metering element in the form of a plate 903 is arranged in the housing 802 and comprises a circular disc, which is sealingly arranged to rotate against the inside of the housing 802 so that the disc will form a wall 903*a* between a first and a second area 821, 822 in the housing 802. The seeds 91 are fed by gravity from the seed bin, 841 in FIG. 4, through a seed channel 51 into the housing 802 against the wall 903*a*, which is provided with a plurality of through retention openings 904 for the reception of seeds 91 on the seed reception side of the wall 803*a*, by means of a wall pressure difference. As an alternative to the gravity feed of seeds from the seed bin, the feeding may be air assisted via a so-called nursing system.

Correspondingly to what has been described in connection with FIG. 2, the first area 821 in the housing 802 communicates with the pneumatic device 501, which is arranged to provide a positive pressure in the air line 502 and in the first area 821, which gives rise to said wall pressure difference between the first area 821 and the second area 822. In the embodiment illustrated, this difference consists of a pressure drop from the first area to the second area. The second area 822 is connected to the inlet side of the pneumatic device 501 via additional pressure actuating appliances through a return line 505.

By the gravity, seeds 91 will be transported through the seed channel 51 into the housing 802. There, individual seeds 91 will be pressed against holes in the disc 903*a* by the fact that there is a positive pressure in the first area 821, the high-pressure side, in relation to the second area 822, the low-pressure side. By the fact that the disc rotates, it will transport seeds 91 in the housing from a seed reception area to a release area. In the release area, a separation device 823 is arranged comprising a roll, rotatable with its rotation axis 900 perpendicular to the rotation axis 905 of the plate 903*a*, and abutting against the low-pressure side of the plate in a position near the inlet mouth of the respective seed metering line 801. Upon the passage of the seed 91, the roll 823 temporary plugs the retention opening, which makes that the pressure difference decreases and the seed comes loose from the plate 903*a* and is directed by the positive pressure in the first area 821 into the respective seed metering line 801 and down into the drill furrow. Analogously to what has been described in connection with FIG. 3, as an alternative to a roll, the separation device 823 may comprise separating walls on the low-pressure side of the plate, which walls form a space at which the pressure difference is lower than elsewhere in the direction of rotation of the plate.

The air from the low-pressure side of the seed metering device 8 is directed through the return line 505 back to the inlet side of the pneumatic device 501 in a circular flow. For filling air into the circular flow because of air disappearing down through the seed metering lines 801, a fresh air line 507 is connected to the return line 505, preferably near the pneumatic device. For balancing the air currents through the seed metering device 8, a distributor valve 5030 is placed between the return line 505 and the fresh air line 507, as previously described.

Also the embodiments described in FIGS. 2, 4 and 5 may be supplemented with air discharge facilities via a seed screen from the seed metering lines 801 according to FIG. 3. In connection with such an air discharge, the embodiments may also be supplemented with pressure regulation valves in the corresponding way.

Figure 6:
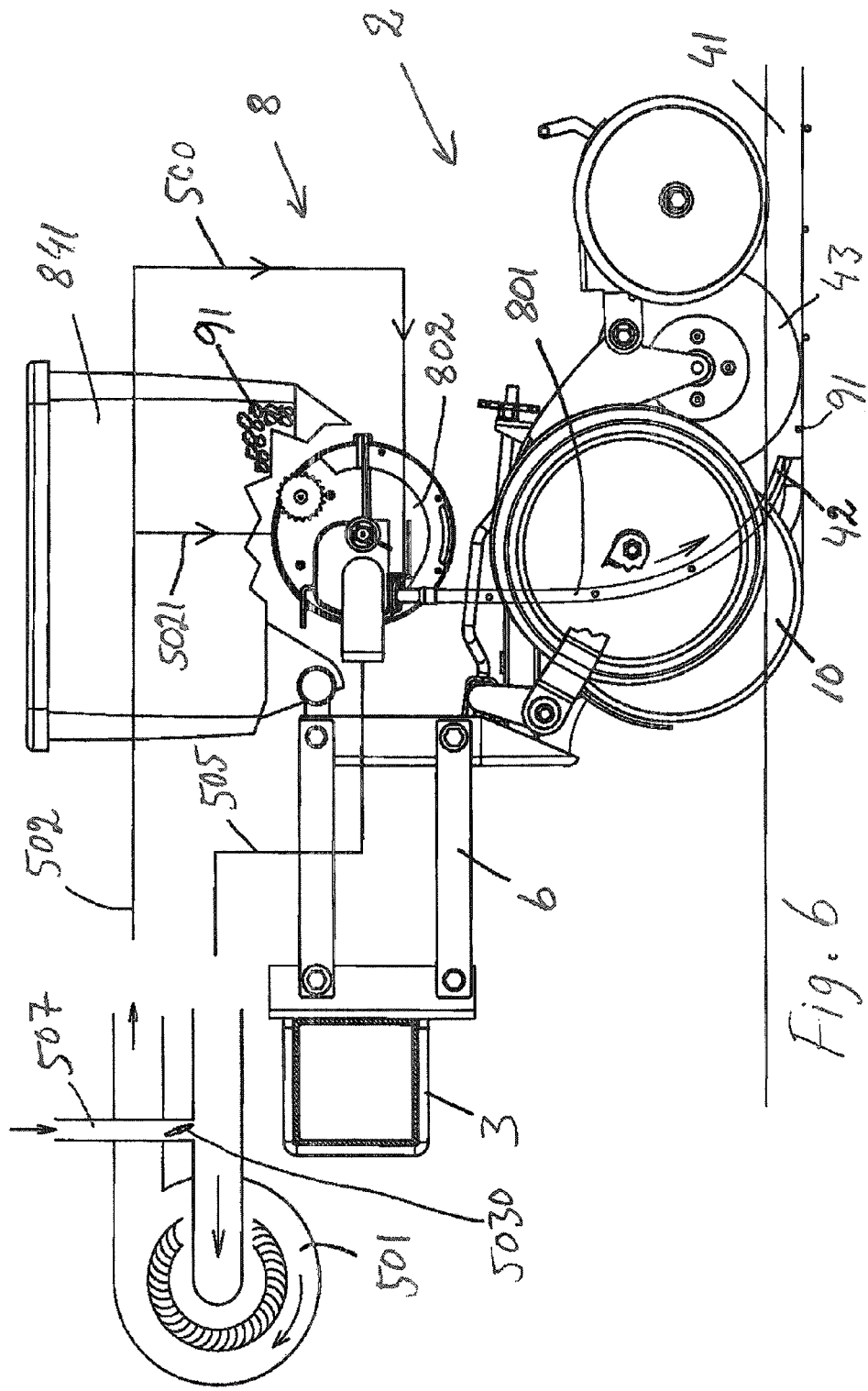
FIG. 6 schematically shows a side view of parts in an agricultural machine of the plate-type having a negative pressure system according to an alternative embodiment of the invention.

FIG. 6 shows a negative pressure system according to the invention, where the figure analogously to FIG. 4 shows a drilling unit 2 for a planter. As previously shown, the planter comprises the drilling units 2, each one of which is, via a link device 6, attached to the planter on a structural member 3 comprising a transverse steel joist. The drilling unit 2 comprises a seed metering device 8 of the plate-type having a housing 802 from which the seed metering lines 801 extend. Inside the housing, there is arranged a singulating device of the plate-type for the seeds, which in itself has been described in FIG. 5. As already has been described in connection with FIG. 4, the planter comprises a seed bin 841 from which seeds 91 are fed by gravity down into the seed metering device 8. Also air assisted pre-feeding via a so-called nursing system may be used. The seed metering device 8 communicates in turn with seed metering lines 801 and is arranged to distribute, via the seed metering lines 801, one seed at a time to a respective drill furrow 41 in the ground. For this sake, a lower mouth 42 of the seed metering line 801 running from the seed metering device 8 is situated immediately behind the engagement of the discs 10 with the ground. Usually, a stop wheel 43 is arranged behind the lower mouth 42 to retard the speed of the seeds 91 in the drill furrow 41 and place them equidistantly from each other. The pressure actuating appliances according to this embodiment of the invention comprise a pneumatic device 501, a communicating air line 502 and a return line 505. In addition, the pressure actuating appliances comprise a fresh air line 507 connected to the return line 505 in order to supply air to the circular flow. The supply of fresh air can be regulated via a distributor valve 5030 placed between the return line 505 and the fresh air line 507, as previously described in connection with FIG. 4. Instead of what has been indicated in connection with FIG. 4, the pneumatic device 501 in the present embodiment example provides a negative pressure on the low-pressure side of the seed metering device 8 by a suction effect that gets the seeds to get caught in the retention openings of the plate. Accordingly, this suction effect that retains the seeds in the retention openings is achieved by a negative pressure in the return line. The air from the pneumatic device 501 is directed further to the high-pressure side of the seed metering device 8 through the communicating air line 502 as well as an air supply line 5021. In this embodiment, also air through the communicating air line 502 may in addition be directed to a dump line 500 that moreover entirely or partly may consist of the seed metering line 801.

The invention claimed is:

1. An agricultural machine comprising:
   a seed metering device to meter seeds for the distribution to the ground across which the agricultural machine moves;
   a pressure actuating device;
   an air line;
   a return line; and
   a dump line,
   wherein the seed metering device includes a wall that is arranged to rotate, the seed metering device is arranged to communicate with the pressure actuating appliance to provide a wall pressure difference between a seed reception side of the wall and an opposite side of the wall that is opposite the seed reception side, wherein the pressure is higher on the seed reception side than on the opposite side,
   wherein the wall is provided with a plurality of through retention openings for the reception on the seed reception side of the wall, by the wall pressure difference, of seeds at the retention openings for subsequent transportation, by the rotation of the wall, through a wall transportation distance and releasing of the seeds,
   wherein the pressure actuating appliance comprises a pneumatic device connected to the air line, wherein the pneumatic device provides a main air current through the air line toward the seed reception side of the wall,
   wherein the return line is connected between the opposite side of the wall that is opposite the seed reception side and the pneumatic device, and
   wherein a part of the main air current is arranged to be brought back to an inlet side of the pneumatic device through the return line, while a part of the main air current is arranged to be directed down into the ground through the dump line.

2. The agricultural machine according to claim 1, wherein the dump line is connected between the seed reception side of the wall and a ground member for diverting at least a part of the main air current.

3. The agricultural machine according to claim 1, wherein the dump line consists of a seed metering line through which seeds are directed down to the ground.

4. The agricultural machine according to claim 1, wherein a branch return line is connected between the dump line and the pneumatic device.

5. The agricultural machine according to claim 4, wherein the branch return line is connected between the dump line and the return line.

6. The agricultural machine according to claim 4, wherein a seed screen is placed between the dump line and the branch return line.

7. The agricultural machine according to claim 4, wherein a first valve is placed in the branch return line arranged to regulate the air current between the dump line and the pneumatic device.

8. The agricultural machine according to claim 1, wherein a fresh air line is connected to the return line, wherein the supply of fresh air is regulated via a distributor valve placed between the return line and the fresh air line.

9. The agricultural machine according to claim 1, wherein, in a positive pressure system, most of the main air current is directed from the air line back to the pneumatic device via the return line.

10. The agricultural machine according to claim 1, wherein, in a negative pressure system, most of the main air current is directed from the pneumatic device to the dump line, while the rest of the air is directed back in the return line.

* * * * *